US006906499B2

(12) United States Patent
Hussein et al.

(10) Patent No.: US 6,906,499 B2
(45) Date of Patent: Jun. 14, 2005

(54) CURRENT MODE BANG-BANG CONTROLLER IN A SWITCHING VOLTAGE REGULATOR

(75) Inventors: Hakam D. Hussein, Eagan, MN (US); Wendong Zhang, Eden Prairie, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 18 days.

(21) Appl. No.: 10/715,092

(22) Filed: Nov. 17, 2003

(65) Prior Publication Data

US 2004/0263134 A1 Dec. 30, 2004

Related U.S. Application Data

(60) Provisional application No. 60/483,052, filed on Jun. 27, 2003.

(51) Int. Cl.[7] .............................. G05F 1/10; G05F 1/652
(52) U.S. Cl. ......................... 323/222; 323/284; 323/287
(58) Field of Search ................................. 323/222, 282, 323/284, 287

(56) References Cited

U.S. PATENT DOCUMENTS

| | | | |
|---|---|---|---|
| 4,455,526 A | 6/1984 | Miller | |
| 5,481,178 A | * 1/1996 | Wilcox et al. | 323/287 |
| 5,729,448 A | 3/1998 | Haynie | |
| 6,057,607 A | * 5/2000 | Rader et al. | 307/11 |
| 6,057,675 A | * 5/2000 | Tateishi | 323/288 |
| 6,147,478 A | 11/2000 | Skelton | |
| 6,163,142 A | * 12/2000 | Tsujimoto | 323/284 |
| 6,222,709 B1 | * 4/2001 | Baba | 323/282 |
| 6,304,066 B1 | * 10/2001 | Wilcox et al. | 323/282 |
| 6,441,681 B1 | 8/2002 | White | |
| 6,456,050 B1 | * 9/2002 | Agiman | 323/282 |
| 6,476,589 B2 | * 11/2002 | Umminger et al. | 323/282 |
| 6,774,611 B2 | * 8/2004 | Umminger et al. | 323/282 |
| 2002/0180410 A1 | 12/2002 | Brooks | |
| 2003/0090253 A1 | 5/2003 | Balakrishnan | |
| 2003/0142519 A1 | 7/2003 | Walters | |
| 2003/0151929 A1 | 8/2003 | Figueroa | |

* cited by examiner

Primary Examiner—Bao Q. Vu
(74) Attorney, Agent, or Firm—Kirk A. Cesari

(57) ABSTRACT

A regulator provides a load voltage. The regulator includes a power driver having a feedback input and a power driver voltage. The regulator includes a comparator having a comparator output related to a combination of the load voltage and a power driver current. The regulator includes a pulse generator controlled by the comparator output and having output pulses with fixed pulse widths. The regulator includes a time limit circuit controlled by the output pulses. The time limit circuit provides the output pulses to the feedback input subject to a time limit between the output pulses.

26 Claims, 12 Drawing Sheets

US 6,906,499 B2

CURRENT MODE BANG-BANG CONTROLLER IN A SWITCHING VOLTAGE REGULATOR

CROSS-REFERENCE TO RELATED APPLICATION

This application claims the benefit of U.S. Provisional Application 60/483,052 filed on Jun. 27, 2003 for inventors Hakam D. Hussein and Wendong Zhang and entitled "Current mode bang-bang regulator controller".

FIELD OF THE INVENTION

The present invention relates generally to switching voltage regulators and in particular controllers in switching voltage regulators.

BACKGROUND OF THE INVENTION

Switching voltage regulators provide regulated power supply voltages with high energy efficiency. These switching voltage regulators, however, either tend to respond poorly to rapid changes in load current or tend to have large steady state ripple. During transient intervals while the switching regulator is adjusting for the load, there tends to be undesirable amounts of overshoot and ripple in the output voltage.

A method and apparatus are needed that will permit operation of switching voltage regulators with improved transient response to rapid changes in the load current, while keeping the steady state ripple to a low value. Embodiments of the present invention provide solutions to these and other problems, and offer other advantages over the prior art.

SUMMARY OF THE INVENTION

Disclosed is a regulator that provides a load voltage. The regulator includes a power driver having a feedback input and a power driver voltage. The regulator includes a comparator having a comparator output related to a combination of the load voltage and a power driver current. The regulator includes a pulse generator controlled by the comparator output and having output pulses with fixed pulse widths. The regulator includes a time limit circuit controlled by the output pulses. The time limit circuit provides the output pulses to the feedback input subject to a time limit between the output pulses.

Other features and benefits that characterize embodiments of the present invention will be apparent upon reading the following detailed description and review of the associated drawings.

DETAILED DESCRIPTION OF ILLUSTRATIVE EMBODIMENTS

In the embodiments described below, a regulator includes a controller circuit that senses a combination of a load voltage and a power driver current of a power driver. The controller circuit provides a controller output that is fed back to a feedback input of the power driver in order to control the load voltage. The controller output controls a driver output to have a duty cycle that changes to adjust for load changes. In one arrangement, an off time between fixed width ON pulses is variable, but is also limited to a minimum value in order to minimize switching noise. In another arrangement, an ON time between fixed width OFF times is variable, but limited to a minimum value in order to minimize switching noise. The time limits avoid a problem with extremely short time pulses that can result in high frequency noise. The controller circuit can be realized as a compact, low cost integrated circuit that is predominantly digital with a minimal amount of integrated analog circuits.

The controller can have the capability of fast response; minimum ripple on the regulated output voltage; low component count, stable control without the use of linear feedback, and small controller die size. The duty cycle and frequency are constant during steady state, and variable during transient load. This constant duty cycle and frequency during steady state load condition results in lower noise in the system. The fixed minimum time feature reduces high frequency noise. The regulator is especially useful in disc drive applications as described below in connection with FIG. 1, but can also be used in many other voltage regulator applications.

Figure 1:
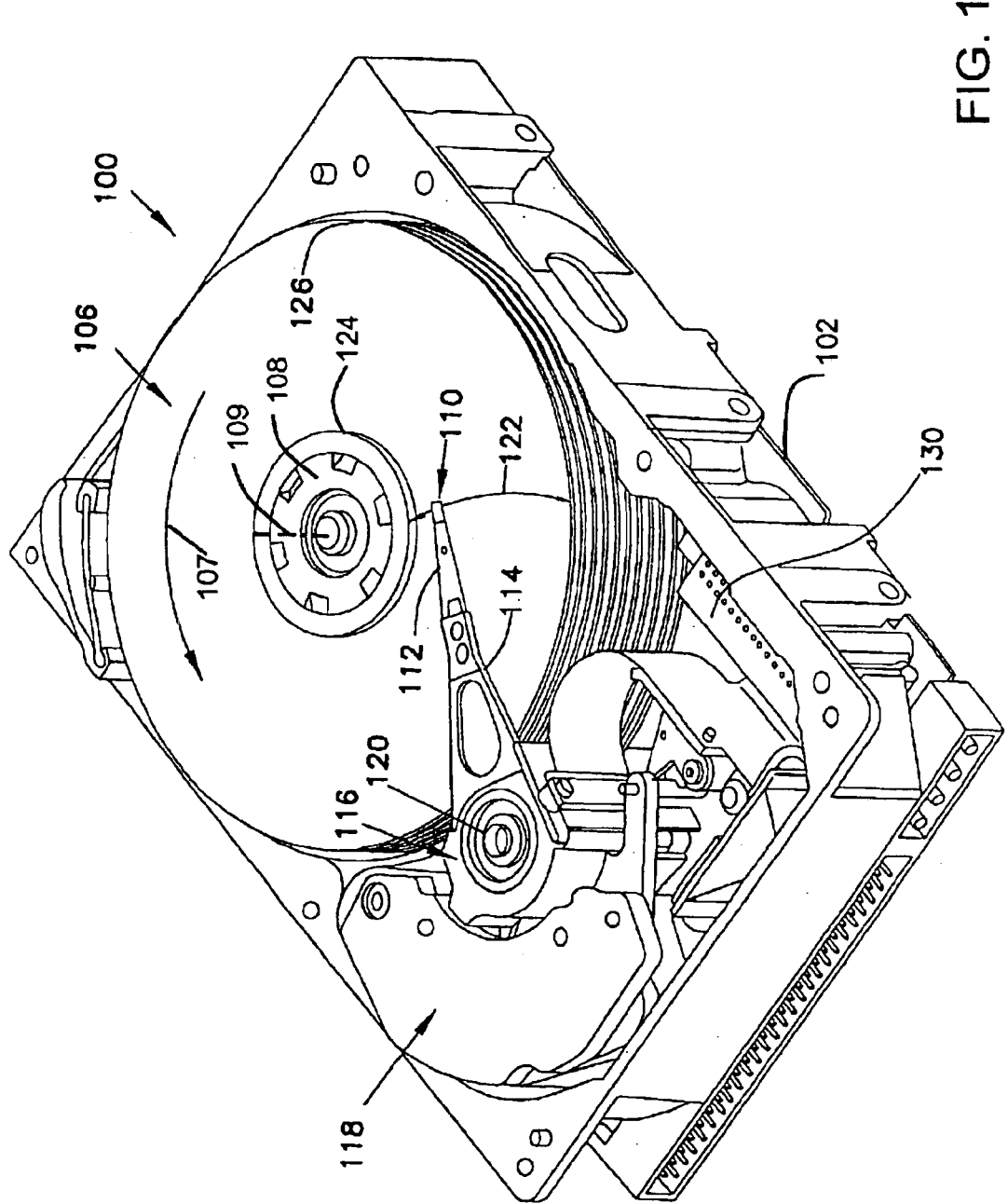
FIG. 1 illustrates an oblique view of a disc drive.

FIG. 1 illustrates an oblique view of a disc drive 100 in which embodiments of the present invention are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation in a direction indicated by arrow 107 about central axis 109. Each disc surface has an associated disc read/write head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached read/write heads 110 about a pivot shaft 120 to position read/write heads 110 over a desired data track along an arcuate path 122 between a disc inner diameter 124 and a disc outer diameter 126. Voice coil motor 118 is driven by electronics 130 based on signals generated by read/write heads 110 and a host computer (not shown). Various functional blocks of electronics 130 and associated transducers in the disc drive 100 can be energized by voltages that are regulated by voltage regulators such as those described below in connection with FIGS. 3–10.

Figure 2:
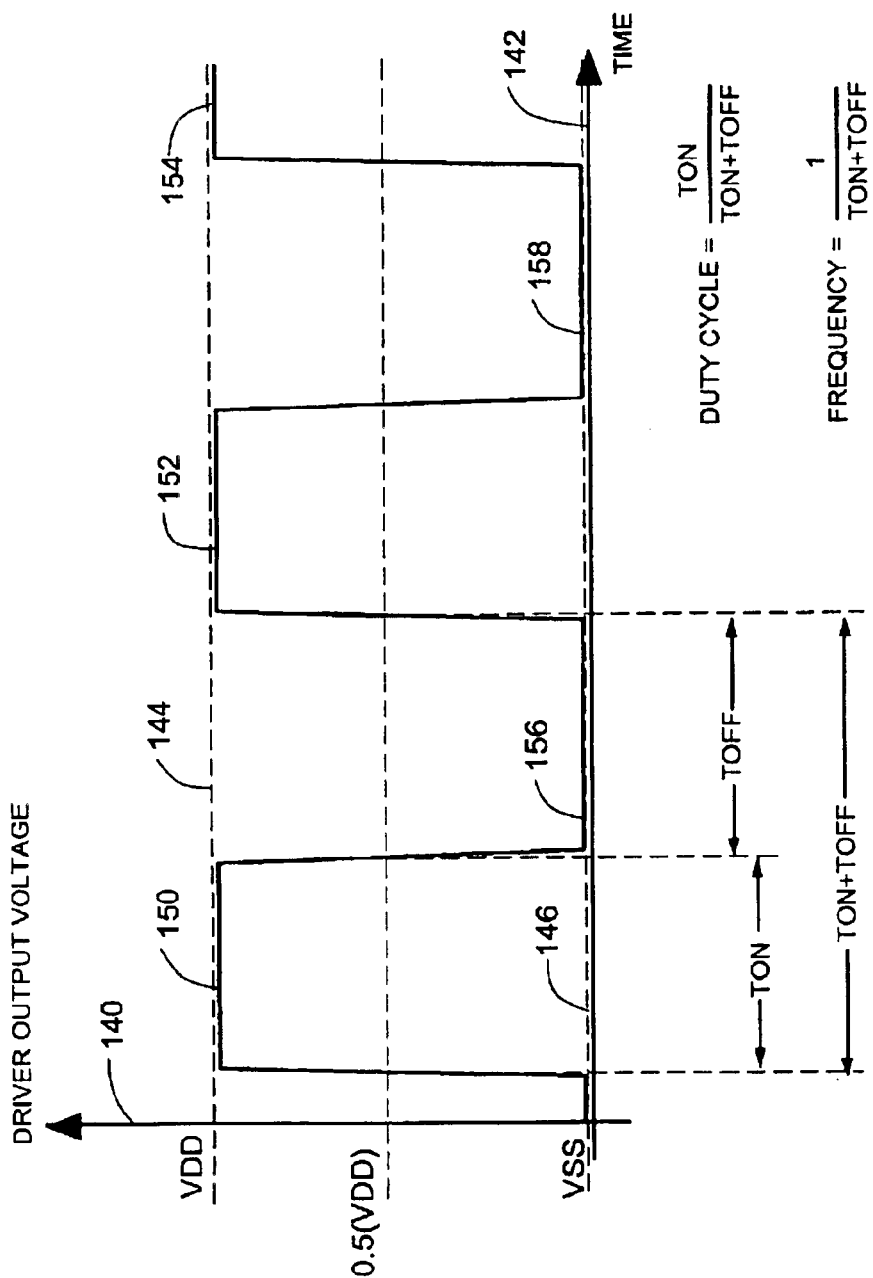
FIG. 2 illustrates a power driver output waveform.

FIG. 2 illustrates an idealized power driver output waveform in a switching regulator. In FIG. 2, a vertical axis 140 represents power driver output voltage and a horizontal axis 142 represents time. The power driver includes switches that alternately connects the driver output to voltage VDD at 144 or voltage VSS at 146, with transitional or switching intervals separating the conduction times of the switches to ensure that both switches are not conducting at the same time. The driver output alternates between ON pulses 150, 152, 154 and OFF pulses 156, 158 as illustrated. The ON pulse 150 has an on time TON. The OFF time interval 156 has an OFF time TOFF. A complete cycle of the power driver output can be seen as running from a start of ON pulse 150 to a start of ON PULSE 152. The complete cycle has a time duration TON+TOFF. A duty cycle of the power driver output is defined as DUTY CYCLE=TON/(TON+TOFF) as illustrated in FIG. 2. A frequency of the power driver output is defined as 1/(TON+TOFF) as illustrated in FIG. 2.

There are numerous types of switching regulators that vary average duty cycle of the power driver output as a function of load voltage. Each of the various types has disadvantages.

Voltage mode regulators have a frequency at the power driver output that can be either constant or variable. The voltage mode regulators have a slow response and relatively large ripple during transient load conditions, but have relatively low steady state ripple. The voltage mode regulators are relatively large and costly.

Current mode regulators have a frequency at the power driver output that can be either constant or variable. The current mode regulators have slow response and relatively large ripple during transient load conditions, but have a relatively low steady state ripple. The current mode switching regulators are relatively large and costly.

Hysteretic mode regulators have a frequency at the power driver output that is either variable or unpredictable. The hysteretic mode regulators have a fast response and relatively small ripple during transient load conditions, but have a relatively large steady state ripple. The hysteretic mode regulators are relatively low cost and small in size.

The regulators described below in connection with FIGS. 3–10, however, do not have any of the disadvantages described above of the voltage mode, current mode and hysteretic mode regulators. The regulators described below in connection with FIGS. 3–10 do not regulate based solely on load voltage, but instead regulate based on a combination of the load voltage and the current provided by the power driver output. The regulators described below have power drive outputs that alternates between a pulse of one polarity with a fixed pulse width, and a pulse of the opposite polarity that has a variable pulse width that is limited to minimum pulse width.

The regulators described below in connection with FIGS. 3–10 are referred to here as CMBB (current mode bang-bang regulators) and provide desirable regulator characteristics such as fast response and low ripple during transient load conditions, and low ripple during steady state conditions. The CMBB regulators have a variable but predictable frequency. The CMBB regulators described below combine desirable characteristics in a single design.

Figure 3:
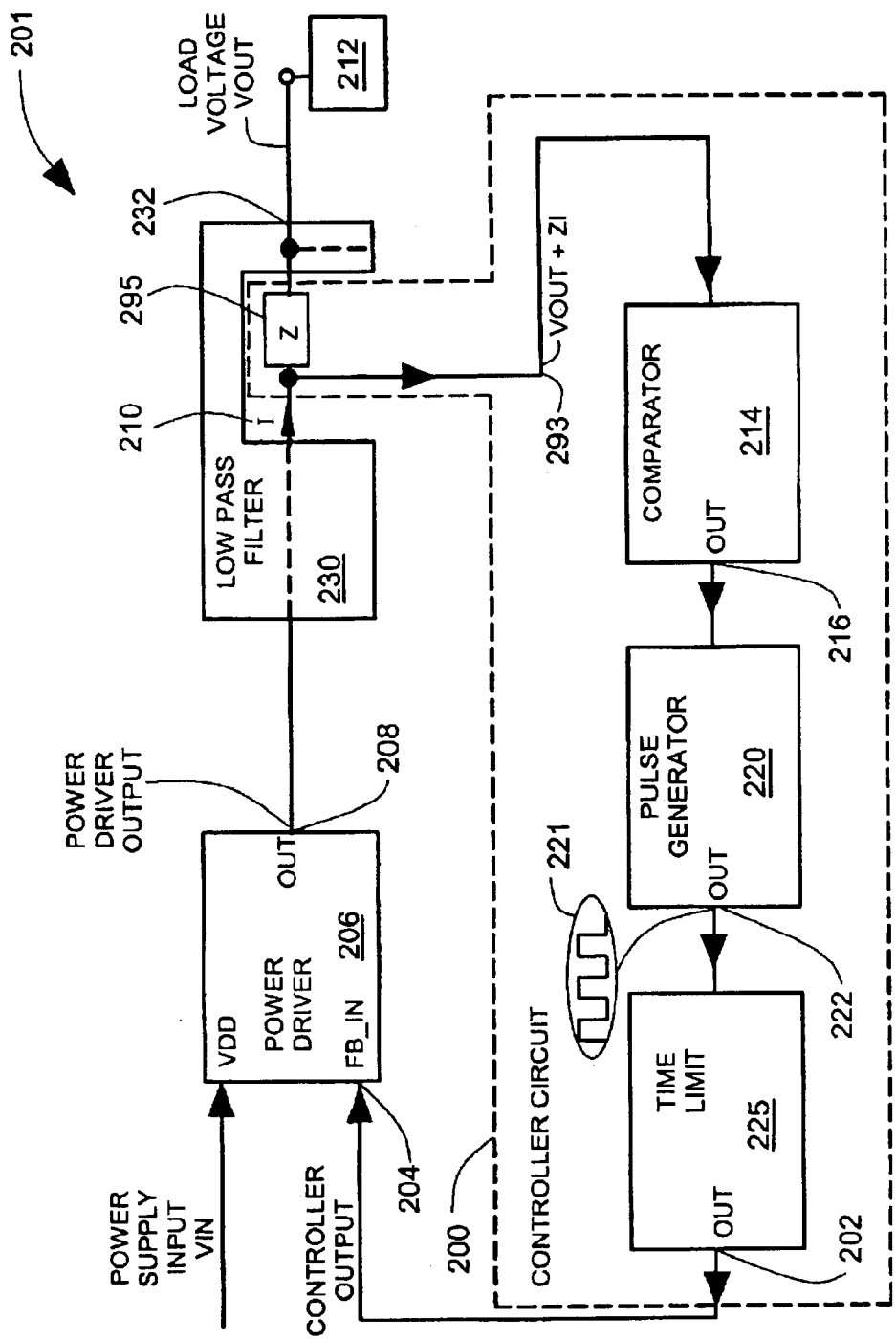
FIG. 3 illustrates a first embodiment of a regulator.

FIG. 3 illustrates a first embodiment of a regulator 201 that includes a controller circuit 200. The controller circuit 200 couples a controller output 202 to a feedback input 204 of a power driver 206. The power driver 206 provides a power driver output 208. The power driver output 208 couples a power driver current I (at 210) to a load 212, and maintains a load voltage VOUT at 232. The power driver 206 serves to energize the electrical load 212 with a relatively constant voltage. The power driver current I passes through an impedance Z (at 295) that is connected to load voltage output VOUT at 232. The arrangement of the impedance Z connected to VOUT generates a voltage on line 293 that is a combination of the load voltage VOUT and the power driver current I that is approximately VOUT+ZI. The impedance Z serves as a weighting factor so that the voltage on line 293 is a weighted sum of the load voltage and the power driver current.

The controller output 202 has a duty cycle that varies as a function of a voltage that the controller circuit 200 senses on line 293. The controller circuit 200 provides closed loop control of the power driver output 208. The duty cycle at controller output 202 is constant when the output current 210 is a fixed current. The duty cycle is variable when the output current 210 is a variable current. When the electrical load 212 is constant, the average output current 210 is a fixed current, the duty cycle is constant and the constant duty cycle tends to ensure a reduced level of noise at the power driver output 208.

The controller circuit 200 comprises a comparator circuit 214 that couples to and senses the voltage on line 293, which voltage is a combination of the load voltage at 232 and the power driver current I. The comparator circuit 214 provides a comparator output 216 that indicates whether the voltage on line 293 is above or below a desired voltage level.

The controller circuit 200 also comprises a pulse generator 220 coupled to the comparator output 216. the comparator output 216 controls or triggers the pulse generator 220. The pulse generator 220 provides output pulses 221 at a pulse output 222. The pulse output 222 provides the output pulses 221 with a fixed time (pulse width) when the comparator circuit 214 indicates that the voltage sensed on line 293 is equal to the desired voltage level. The fixed pulse width energizes the output voltage back up again in the fixed on time case (see FIG. 11A), but it discharges the output voltage during the fixed off time case (see FIG. 11B). As explained in more detail below, the fixed pulse width can be either an ON pulse width (FIGS. 4–5) or, alternatively, an OFF pulse width (FIG. 6).

The controller circuit 200 also comprises a time limit circuit 225 coupled to the pulse output 222. The pulses 221 at output 222 control or trigger the time limit circuit 225. The time limit circuit 225 provides the controller output 202 that couples to the feedback input 204. The time limit circuit 225 passes on or replicates some of the pulses at the pulse output 222. The time limit circuit 225 generally passes on most of the pulses at the pulse output 222. However, when pulses at the pulse output 222 are so closely spaced that the time of the variable portion of pulse output 222 becomes too short, then the time limit circuit 225 blanks, or does not pass on some of closely spaced fixed width pulses to the controller output 202. This arrangement limits a variable time of a pulse from the controller output 202 to an minimum time value. When the fixed pulse is an ON pulse, the time limit circuit 225 limits an OFF time to a minimum off time value as described in more detail below in connection with FIGS. 4–5. Alternatively, when the fixed pulse is an OFF pulse, the time limit circuit 225 limits an ON time to a minimum on time value as described in more detail below in connection with FIG. 6. The minimum time value (either ON or OFF) limits a frequency of a noise at the power driver output 208 to a maximum frequency. This arrangement reduces high frequency noise in the power driver current 210 associated with short spikes with widths shorter than the minimum time value. The quality of energization delivered to the electrical load 212 is improved. For loading in a normal range, one time is fixed and the other time is variable and limited to reduce high frequency noise. The sensing of a combination of load voltage and output current minimizes phase delay. As describe below in connection with FIGS. 4–5, the time limit circuit 225 can comprise an OFF time limit circuit 226, and as described below in connection with FIG. 6, the time limit circuit 225 can alternatively comprise an ON time limit circuit 227.

The controller circuit 200 preferably also comprises a low pass filter 230 coupled to the power driver output 208. The low pass filter 230 provides a filtered regulator output 232 (load voltage) to the electrical load 212. The use of the low pass filter 230 further reduces high frequency noise that reaches the electrical load 212.

Figure 4:
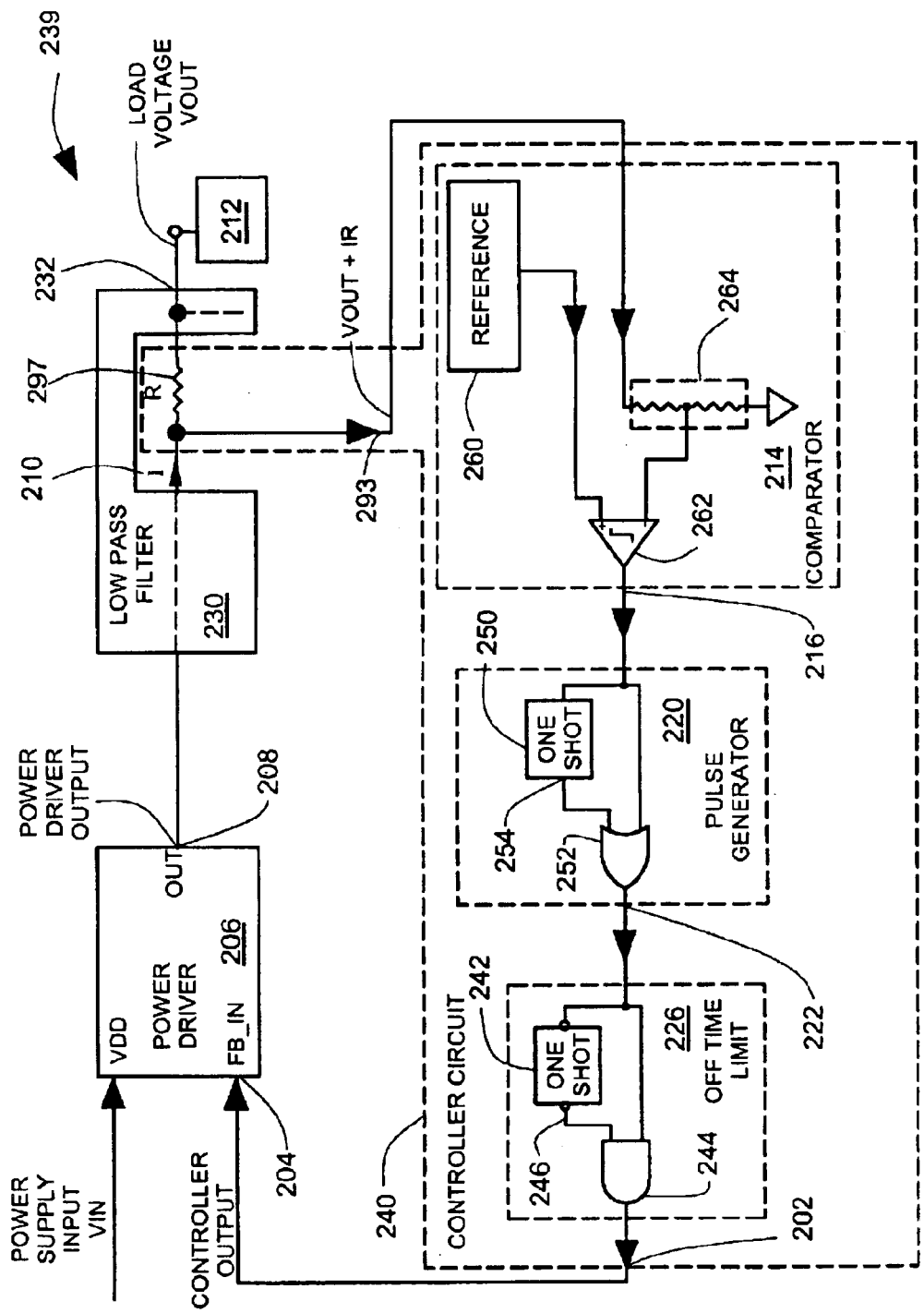
FIG. 4 illustrates a second embodiment of a regulator.

FIG. 4 illustrates a second embodiment of a regulator 239 that includes a controller circuit 240. Reference numbers used in FIG. 4 that are the same as reference numbers used in FIG. 3 identify the same or similar features. An off time limit circuit 226 comprises a first one shot circuit 242 and an AND gate 244. A first input of the AND gate 244 is coupled to an output 246 of the first one shot circuit 242. The pulse output 222 couples to a second input of the AND gate 244 and to an input of the first one shot circuit 242. The first one shot 242 has a one shot pulse width that sets an off time limit. When the one shot 242 is triggered by a falling edge of the pulse output 222, the one shot output 246 goes to a low level and provides blanking so that subsequent pulses from the pulse output 222 that are too closely spaced are blanked at the AND gate 244 and do not pass through to the output of the AND gate 244.

The pulse generator 220 comprises a second one shot circuit 250 and an OR gate 252. One input of the OR gate 252 is coupled to an output 254 of the second one shot circuit 250. The arrangement provides a pulse output 222 that has pulses that are triggered by rising edges of pulses from the comparator output 216, but are stretched in length by a pulse width of the second one shot 250. The pulse width of the second one shot 250 is a fixed pulse width. The OR gate 252 provides an OR function. NOR gates also provide an OR function, and it will be understood by those skilled in the art that a NOR gate can be used in place of OR gate 252 if corresponding polarity inversions are made at inputs connected to the NOR gate output.

The controller 240 further comprises a reference circuit 260 that is included in the comparator circuit 214. The comparator circuit 216 also comprises a comparator 262 and a resistive voltage divider 264 that couples to the comparator 262 and a voltage VOUT+IR on line 293. In FIG. 4, an impedance that carries the power driver current 210 comprises a resistance R at 297. When a proportion of the voltage on line 293 falls to a level below the reference 260, then the comparator 262 provides a pulse on the comparator output 216. The proportion is set by a resistance ratio in the resistive voltage divider 264. The use of the voltage divider 264 allows for use of a reference 260 that is conveniently within the range of power supply voltage rails.

In other respects, the controller circuit 240 illustrated in FIG. 4 is similar to the controller circuit 200 illustrated in FIG. 3.

Figure 5:
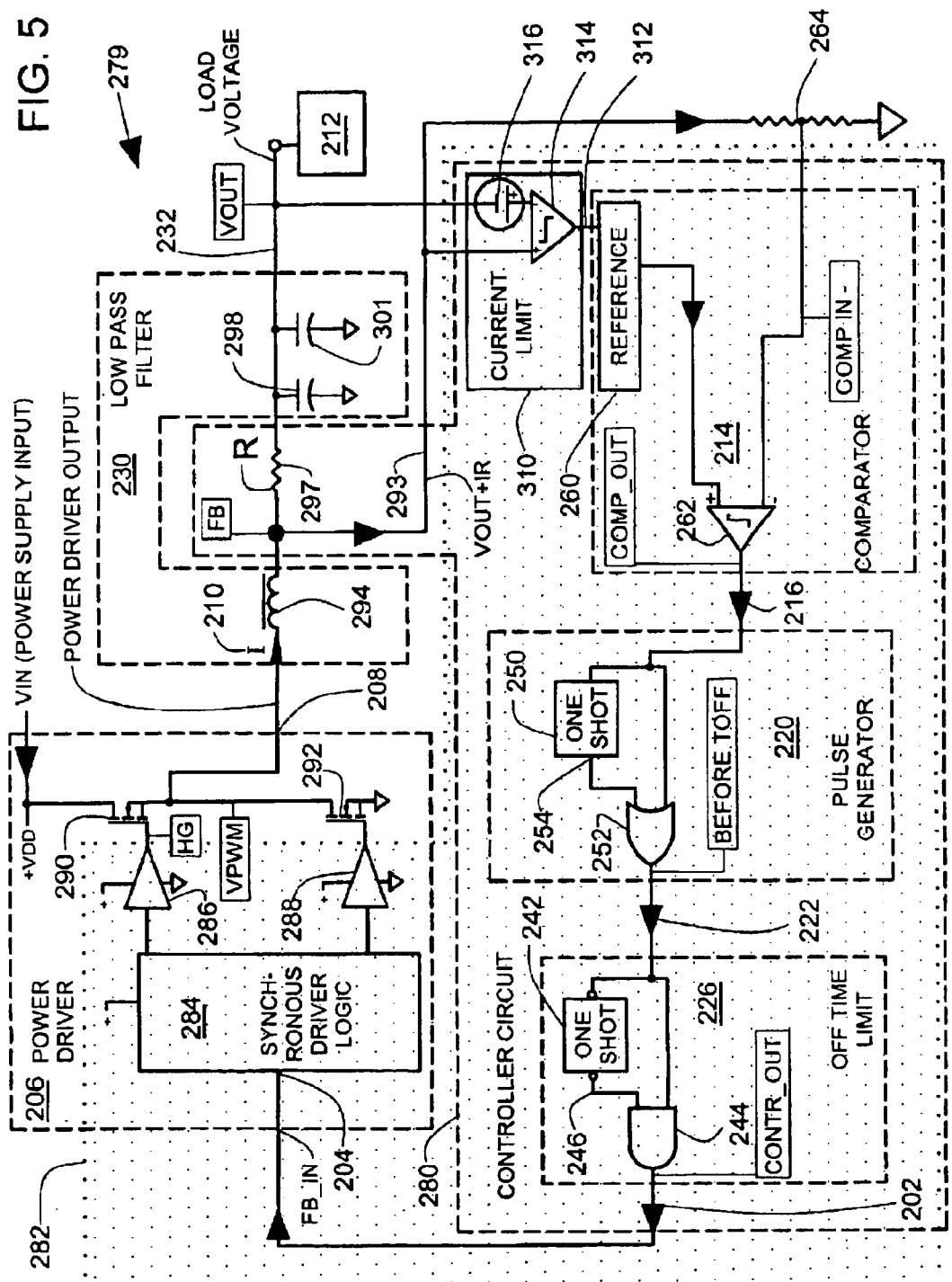
FIG. 5 illustrates a third embodiment of a regulator with variable OFF time and an OFF time limit.
Figure 6:
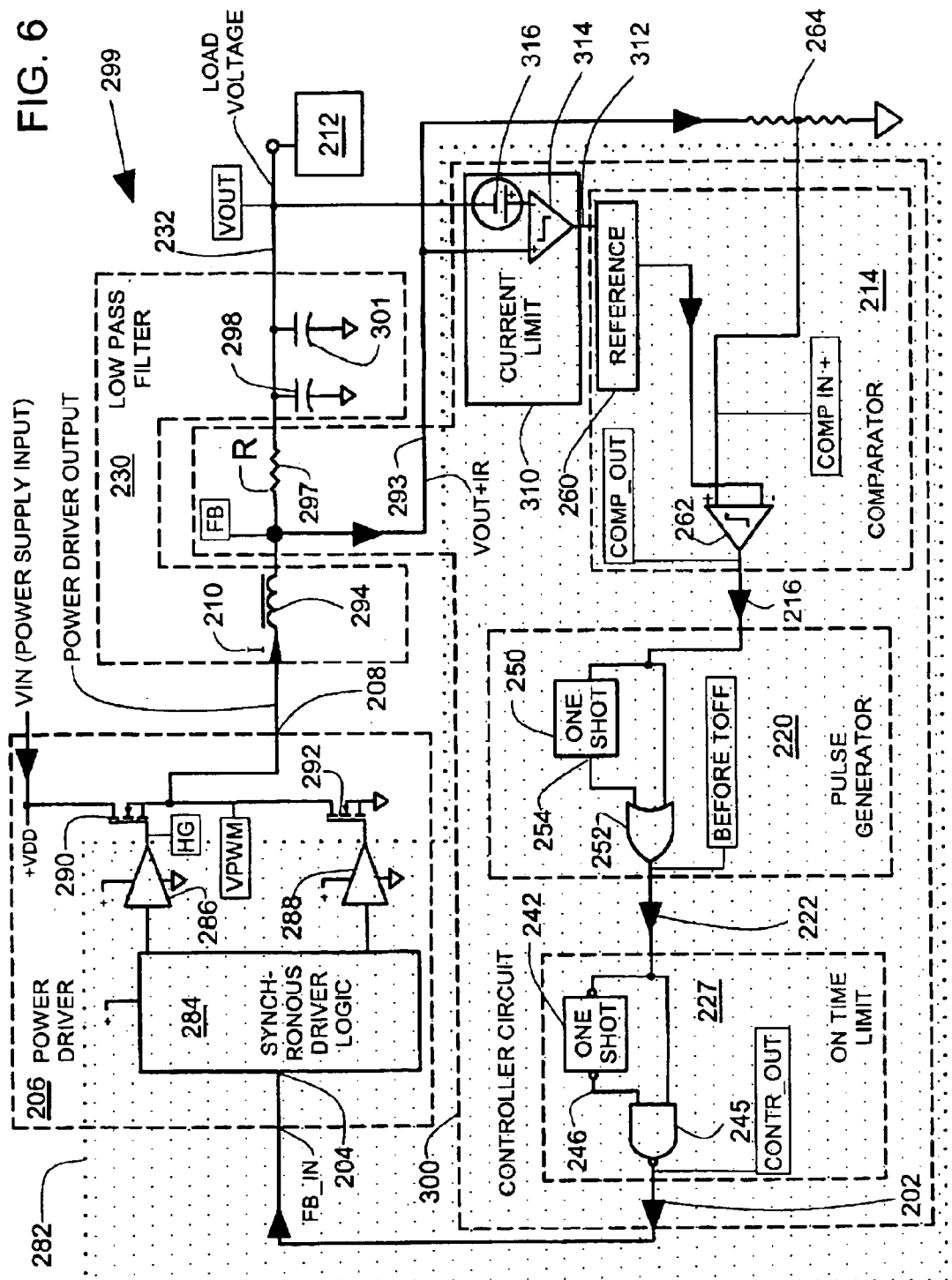
FIG. 6 illustrates a fourth embodiment of the a regulator with variable ON time and an ON time limit.

FIG. 5 illustrates a third embodiment of a regulator 279 that includes a controller circuit 280 with variable OFF time and an OFF time limit. Reference numbers used in FIG. 5 that are the same as reference numbers used in FIG. 4 identify the same or similar features.

The controller circuit 280 is preferably formed as an integrated circuit 282 indicated by a dotted line surrounding portions of circuitry that are included in the integrated circuit. Other functional blocks (not illustrated) can also be included in the integrated circuit 282. In addition to the controller circuit 280, the integrated circuit 282 can also include synchronous driver logic 284 and drivers 286, 288 that are part of the power driver 206. The components of integrated circuit 282 are preferably all produced on a single silicon chip for low cost production. The integrated circuit 282 can be a predominantly digital integrated circuit, limiting the use of complex linear amplifier circuitry that uses large areas of silicon real estate.

The regulator 279 comprises a current mode bang-bang switching regulator and the control output 202 has a duty cycle that controls the power driver 206. The current mode bang-bang switching regulator preferably includes MOSFETs 290, 292. The transistor 290 is turned on to connect a positive (VDD) rail to the power driver output 208. The transistor 292 is turned on to connect DC common (VSS) to the power driver output 208. The synchronous driver logic 284 ensures that only one of the transistors 290, 292 is turned on at any particular instant, thereby avoiding a short circuit between the VDD and VSS rails. It will be understood by those skilled in the art that various types of solid state switches (BJTs, FETS) can be used in place of the MOSFETS 290, 292 with the provision of free wheeling diodes across the transistor outputs, as needed.

The low pass filter 230 comprises an inductor 294 and one or more capacitances 298, 301 coupled to the resistance 296. Ceramic capacitor with low equivalent series resistance (ESR) can be used because the regulator does not rely on the presence of a large ESR in order to function. The use of tantalum capacitances in the low pass filter 230 can be avoided.

The controller circuit 280 further comprises a current limit circuit 310 coupled to the voltage on line 293 and the load voltage at output 232. The current limit circuit 310 has a current limit control output 312 that controls the reference 260 as a function of the voltage on line 293 and the load voltage at output 232 during a start up time to provide a soft start. The soft start prevents large inrush currents from occurring during the start up time, the current limit circuit 310 includes a comparator 314 and a solid state series voltage reference 316. The voltage reference 316 effectively sets a fixed limit on a voltage difference between line 293 and the load voltage at output 232 during start up. During steady state operation, reference 260 is a fixed accurate voltage source.

In other respects, the controller circuit 280 illustrated in FIG. 5 is similar to the controller circuit 240 illustrated in FIG. 4. Voltages in FIG. 5 are marked CONTR_OUT, HG, VPWM, FB, VOUT, COMP_OUT, BEFORE_TOFF. Exemplary simulation timing diagrams of these voltages are described below in connection with FIGS. 7–10.

FIG. 6 illustrates a fourth embodiment of a regulator 299 that includes a controller circuit 300 with variable ON time and an ON time limit. Reference numbers used in FIG. 6 that are the same as reference numbers used in FIG. 5 identify the same or similar features.

In FIG. 6, the input connections of the comparator 262 are reversed in comparison to the input connections in FIG. 5. In FIG. 6, the reference 260 connects to an inverting (−) input, but in FIG. 5, the reference connects to a non-inverting (+) input. Also, in FIG. 6, the resistive voltage divider 264 connects to a non-inverting (+) input of the comparator 262, but in FIG. 5, the voltage divider 264 connects to the inverting (−) input.

In FIG. 6, an ON time limit circuit 227 includes a NAND gate 245, but in FIG. 5, the off time limit circuit 226 includes an AND gate 244. Both the AND gate 244 and the NAND gate 245 comprise AND functions, however, the output of the NAND gate 245 is inverted in polarity.

The polarity of the connection to the comparators 262 and the polarity of the AND functions of time limit circuits 226, 227 in FIGS. 5 and 6 determine which level (VDD or VSS in FIG. 2) of the power driver output 208 has a fixed time interval and which level has a variable, but limited, time interval.

In FIG. 5, the VDD (ON) level has a time TON that is fixed or constant, and the VSS (OFF) level has a time TOFF that is variable, but limited. In FIG. 5, TOFF is varied in a predictable manner to control duty cycle.

In FIG. 6, the VSS (OFF) level has a time TOFF that is fixed or constant, and the VDD (ON) level has a time TON that is variable, but limited. In FIG. 6, TON is varied in a predictable manner to control duty cycle.

In other respects, the controller circuit 300 illustrated in FIG. 6 is similar to the controller circuit 280 illustrated in FIG. 5. In both FIGS. 5 and 6, the pulse generator 220 includes a one shot 250 that sets a fixed pulse width for a first polarity, and the off time limit circuit 226 includes a one shot 242 that provides a time limit for a variable pulse width for a second opposite polarity. It will be understood by those skilled in the art that there are numerous other combinations polarities of equivalent logic can be used to achieve the same control over the pulse widths that are described in FIGS. 2-6.

Figure 7:
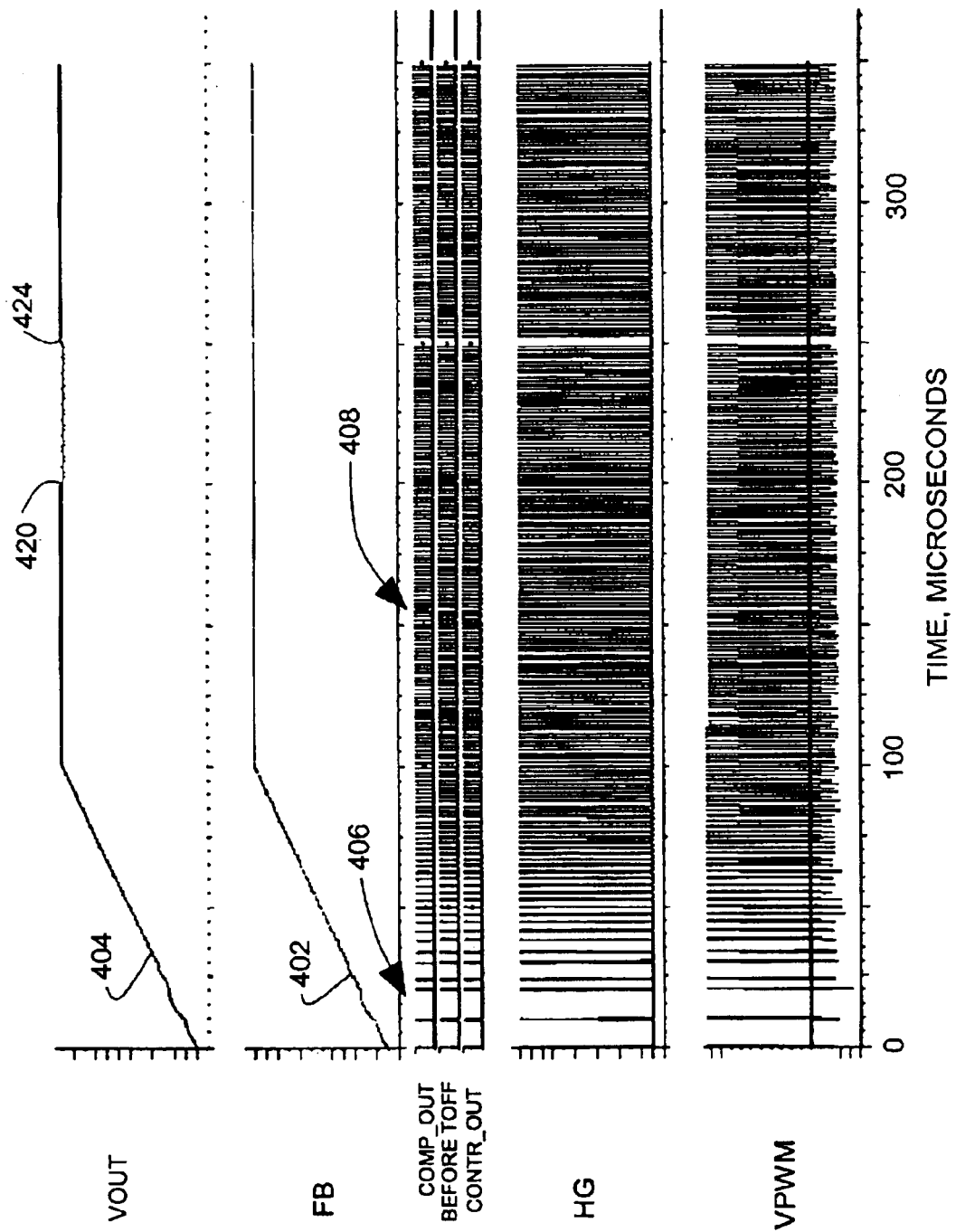
FIG. 7 illustrates a simulation timing diagram for the regulator illustrated in FIG. 5.

FIG. 7 illustrates a simulation timing diagram for the circuit illustrated in FIG. 5. At startup, voltage FB (line 293 in FIG. 5) ramps up slowly at 402 under the control of a ramp generator (such as ramp generator 552 in FIG. 12). The load voltage VOUT also ramps ups slowly during startup at 404. During startup, pulses at voltages COMP_OUT, BEFORE_TOFF and CONTROL_OUT are limited in repetition rate by a ramp generator (see FIG. 12) as shown at 406, and after startup, the pulses are produced at a higher repetition rate shown at 408 that depends on a fixed time (fixed ON or fixed OFF time). Corresponding pulses appear at HG and VPWM in FIG. 5. After startup, the load draws a power driver current of 0.2 amperes. At point 420, the load current abruptly changes and the power driver current increases to 1.2 amperes. At point 424, the load current abruptly changes again, and the power driver current decreases back to 0.2 amperes. Small portions of the timing diagram in FIG. 7 are shown in more detail below on an expanded (zoomed) time scale in FIGS. 8-10.

Figure 8:
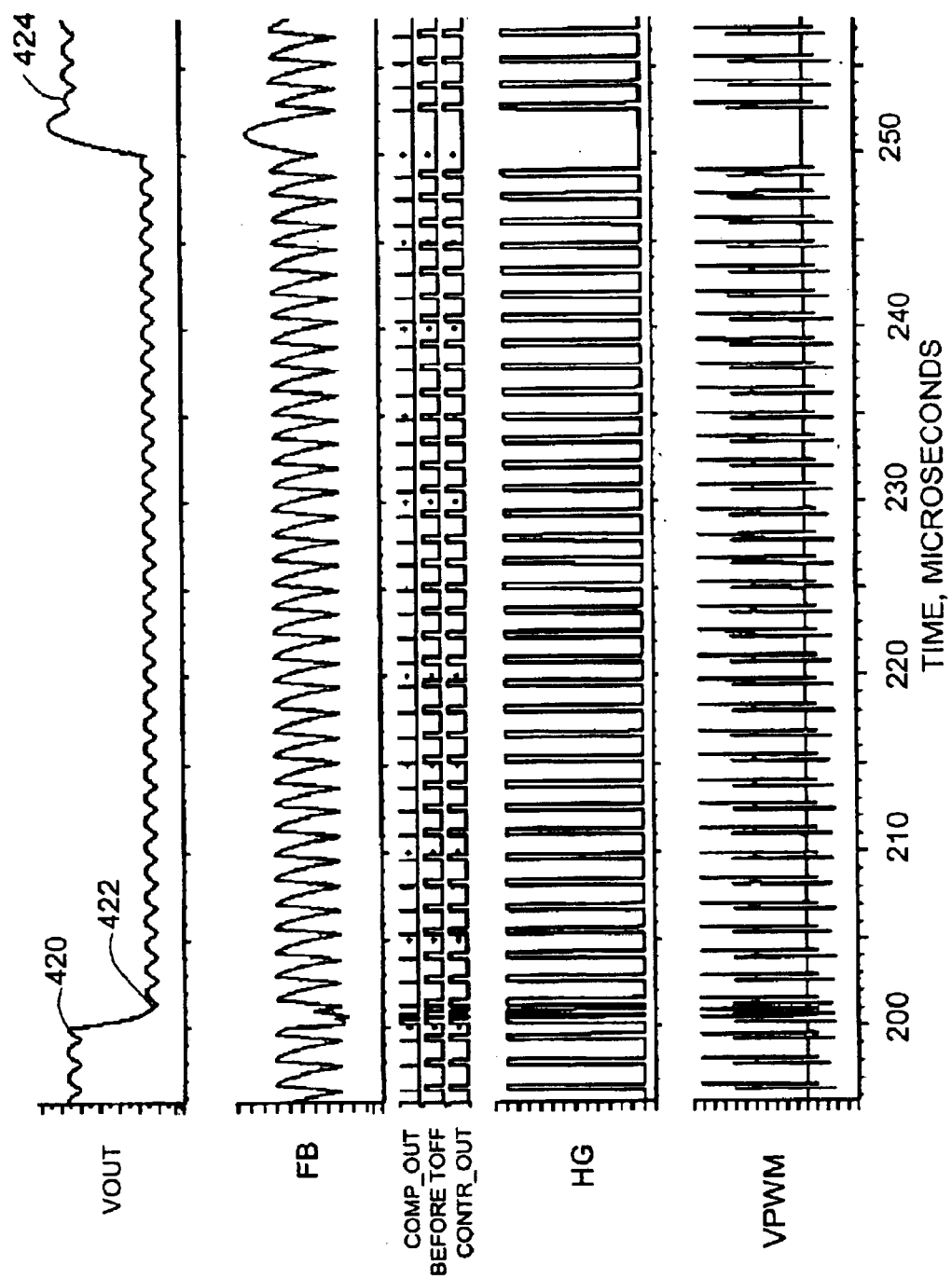
FIG. 8 illustrates a first zoomed portion of the simulation timing diagram illustrated in FIG. 7.

FIG. 8 illustrates a first zoomed portion of the simulation timing diagram illustrated in FIG. 7 in which the power driver current increases from 0.2 amperes to 1.2 amperes and then drops back to 0.2 amperes. The voltages illustrated in FIG. 8 are the same voltages that are illustrated in FIG. 7. In FIG. 7, a 350 microsecond time interval is illustrated. In FIG. 8, however, a 60 microsecond zoomed interval is illustrated. In FIG. 8, power driver current changes abruptly from 0.2 amperes to 1.2 amperes as illustrated by an abrupt drop in VOUT at 420. VOUT drops in response to the increased power driver current to a lower voltage level as illustrated at 422, however, the ripple level remains substantially the same. In FIG. 8, power driver current changes abruptly from 1.2 amperes to 0.2 amperes as illustrated by an abrupt rise in VOUT at 424. VOUT rises in response to the decreased power driver current to a higher voltage level as illustrated at 424, however, the ripple level remains substantially the same, and there is very little overshoot.

Figure 9:
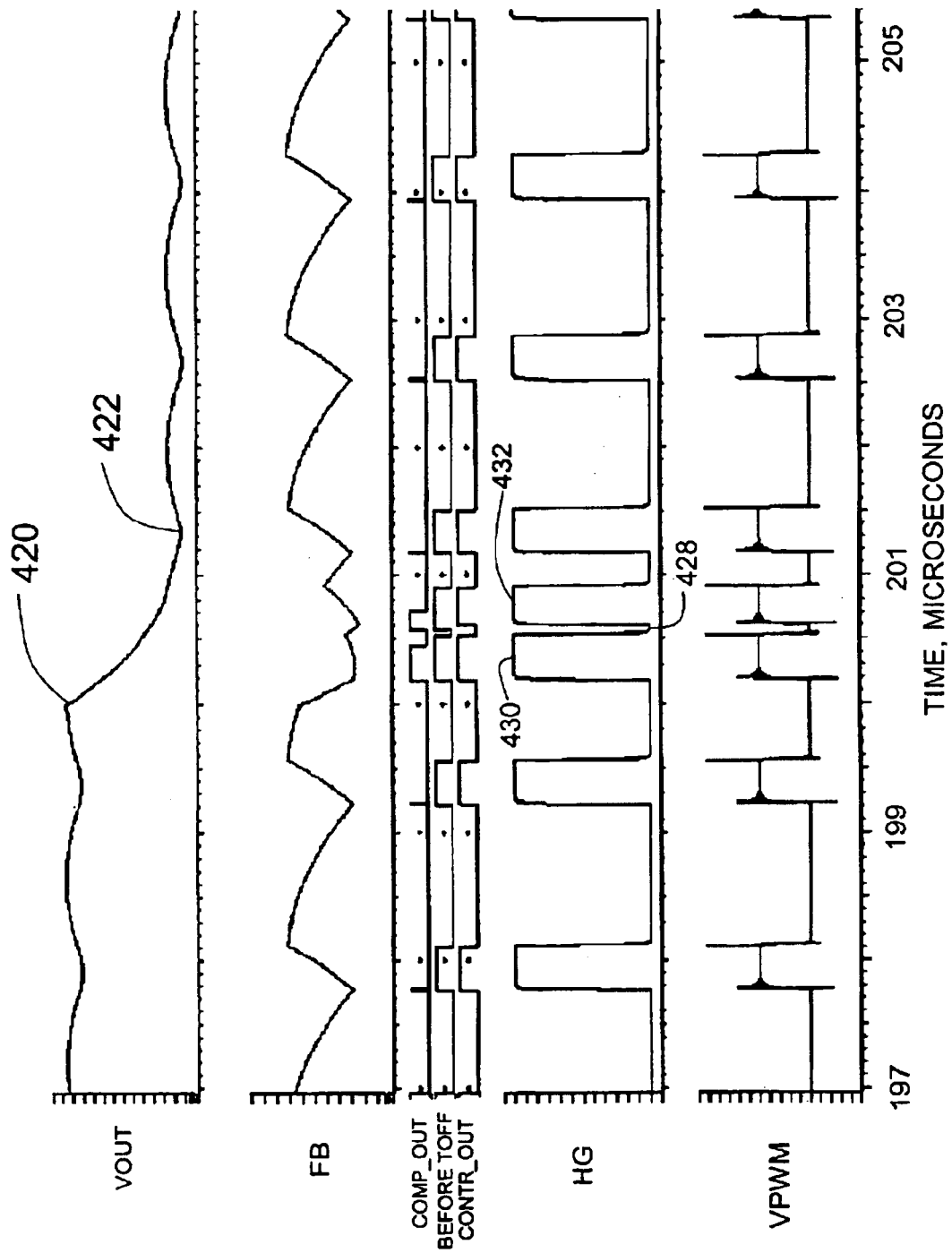
FIG. 9 illustrates a second zoomed portion of the simulation timing diagram illustrated in FIG. 7.

FIG. 9 illustrates a further zoomed portion of the zoomed simulation timing diagram illustrated in FIG. 8. The voltages and conditions illustrated in FIG. 9 are the same as the voltages and conditions illustrated in FIG. 8, however, FIG. 9 illustrates an 8 microsecond interval around the time that the power driver current changes abruptly from 0.2 to 1.2 amperes. As can be seen in FIG. 9 at 428, a minimum off time is maintained between pulses 430, 432, and pulses 430, 432 have a fixed pulse width.

Figure 10:
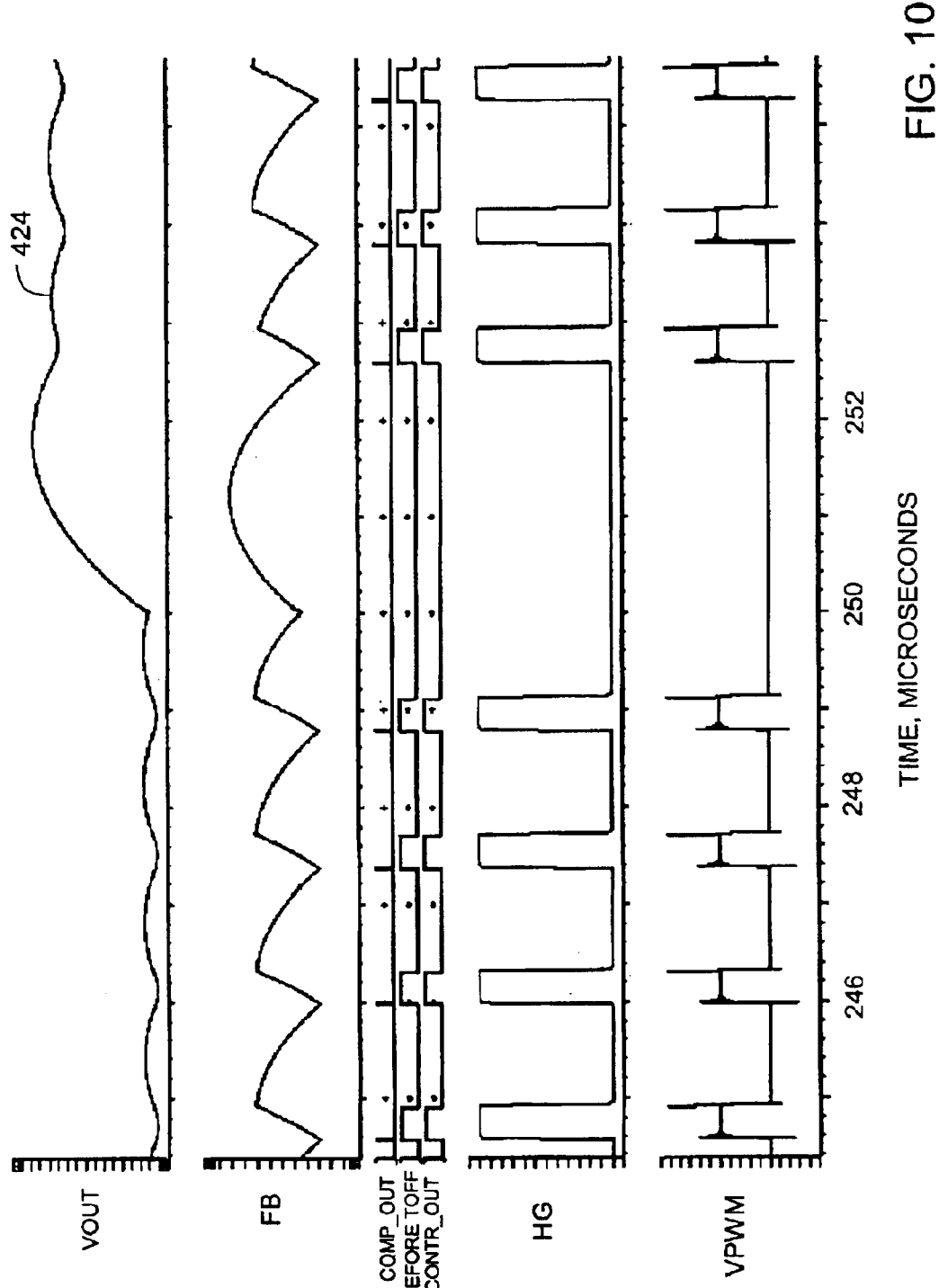
FIG. 10 illustrates a third zoomed portion of the simulation timing diagram illustrated in FIG. 7.

FIG. 10 illustrates a further zoomed portion of the simulation timing diagram illustrated in FIG. 8. In FIG. 10, a 10 microsecond interval around the point 424 at which power driver current decreases from 1.2 to 0.2 amperes is illustrated.

Figure 11A:
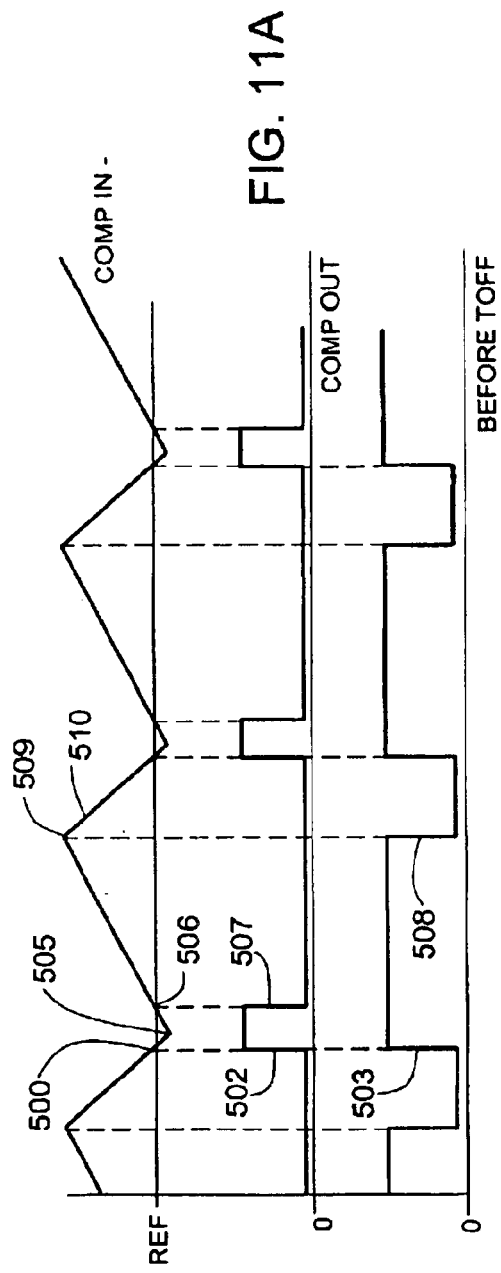
FIGS. 11A, 11B schematically illustrate timing diagrams that show synchronization of various signals in FIGS. 5, 6.
Figure 11B:
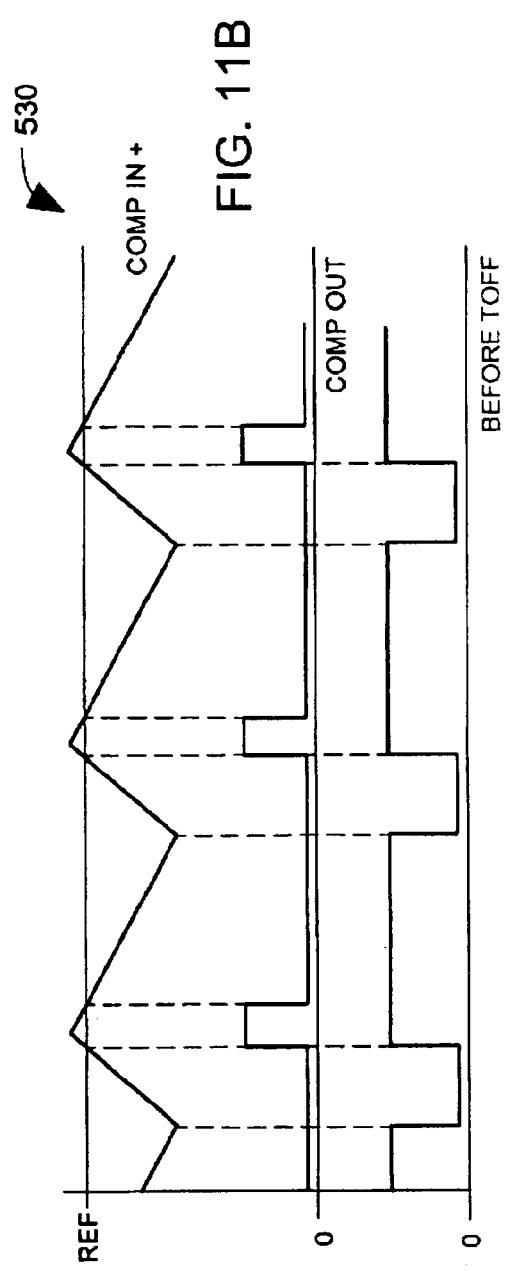

FIGS. 11A, 11B schematically illustrate timing diagrams that show synchronization of various signals in FIGS. 5, 6.

FIG. 11A illustrates idealized waveforms for the circuit shown in FIG. 5. When the voltage (COMP IN-) applied to an inverting input of comparator 262 falls to the level of a non-inverting input (REF) at 500, the comparator output (COMP OUT) turns on at 502. When the comparator output turns on at 502, then the pulse generator output (BEFORE TOFF) turns on at 503. After a switching delay, the power driver turns on and begins charging the capacitors 298, 301 resulting in an rise, starting at 505, in the voltage applied to the inverting input of comparator 262. When the voltage applied to the inverting input rises above the reference voltage (REF) at 506, the comparator output turns off at 507, however, since the comparator output is ORed with one shot 250, the pulse generator output (BEFORE TOFF) stay high for a fixed time until point 508 where the power drive is shut off at point. When the power drive is shut off, the voltage at the inverting input begins falling again at 510. A similar pattern occurs in FIG. 11B at 530, however the fixed time interval is an OFF time in FIG. 11B rather than an ON time as in FIG. 11A.

Figure 12:
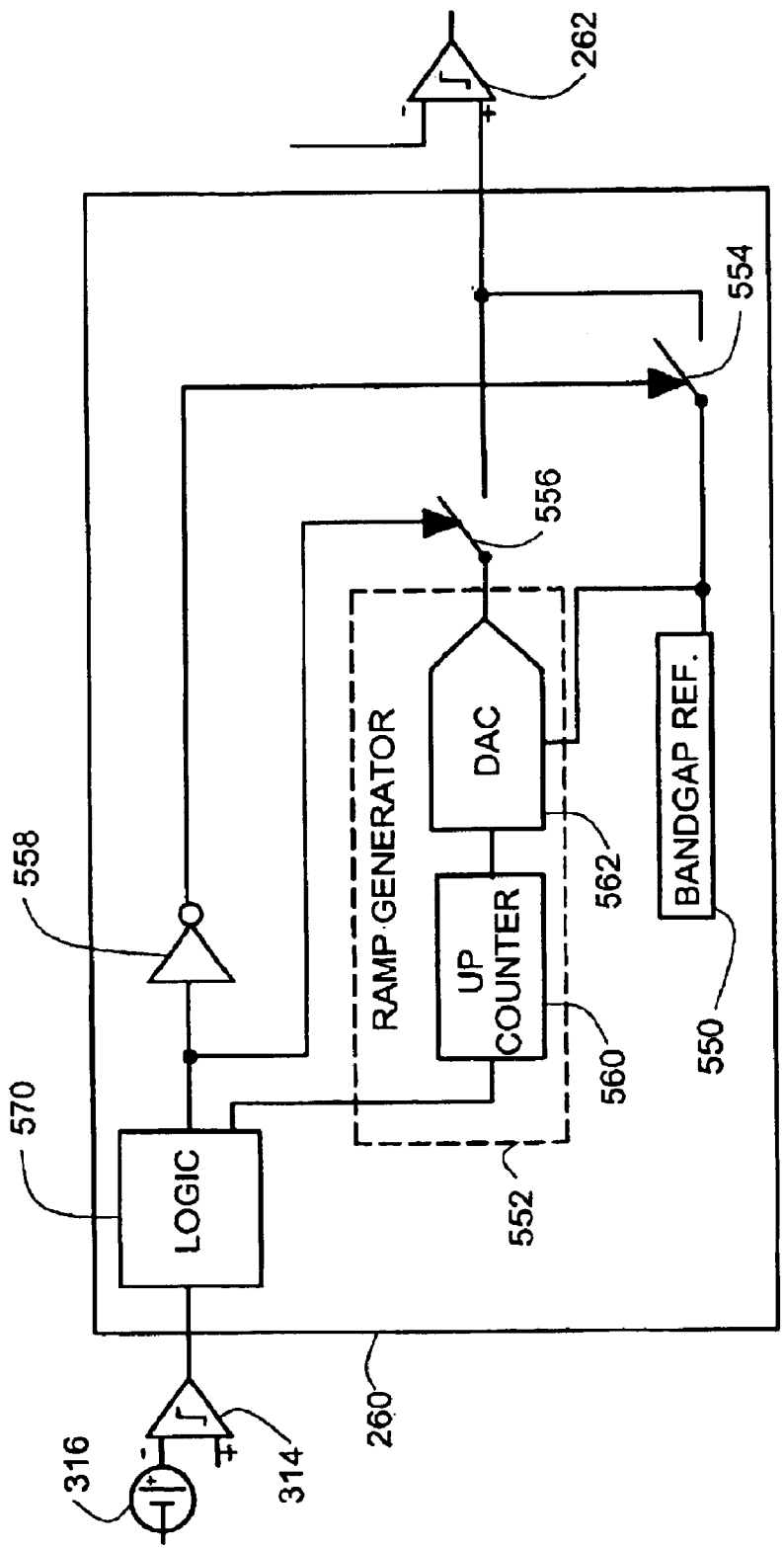
FIG. 12 schematically illustrates an embodiment of a reference controlled by a current limit circuit to provide a soft start.

FIG. 12 schematically illustrates an embodiment of a reference controlled by a current limit circuit to provide a soft start. The arrangement shown in FIG. 12 is applicable to FIG. 5, and reference numbers used in FIG. 12 that are the same as reference numbers used in FIG. 5 identify the same or similar features. In FIG. 12, Reference 260 includes a bandgap reference 550 and a ramp generator 552. The ramp generator 552 can comprise an up counter 560 controlling a DAC 562 as shown. The ramp generator 552 can also comprise alternate circuit arrangements that are known to generate a ramp output. A switch 554 connects the bandgap reference to the non-inverting input of comparator 262. A switch 556 connects the ramp generator 552 to the non-inverting input of the comparator 262. The switches 554, 556 are controlled using inverter 558 so that only one switch conducts at a time. During turn-on of the circuit, the comparator 314 triggers the logic circuit 570 to open switch 554 and close switch 556 such that the ramp generator 552 is connected to the non-inverting input of comparator 262. The logic circuit triggers the ramp generator 552 to provide a ramp voltage output as a reference output during the turn-on time interval. This provides a soft start for the regulator. After the turn-on interval is complete, then the comparator 314 triggers the logic 570 to open switch 556 and close switch 554 so that the stable bandgap reference 550 is connected to the non-inverting input of the comparator 262.

In summary, a regulator (such as 201) provides a load voltage (such as 232). The regulator includes a power driver (such as 206) having a feedback input (such as 204) and a power driver voltage (such as at 208). The regulator includes a comparator (such as 214) having a comparator output (such as 216) related to a combination (such as on line 293) of the load voltage and the power driver current. The regulator includes a pulse generator (such as 220) controlled by the comparator output and having output pulses (such as 221) with fixed pulse widths. The regulator includes a time limit circuit (such as 225) controlled by the output pulses. The time limit circuit provides the output pulses to the feedback input subject to a time limit between the output pulses.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the voltage regulator while maintaining substantially the same functionality without departing from the scope and spirit of the present invention. In addition, although the preferred embodiment described herein is directed to a controller for a voltage regulator in a disc drive, it will be appreciated by those skilled in the art that the teachings of the present invention can be applied to other voltage regulators, without departing from the scope of the present invention.

What is claimed is:

1. A regulator providing a load voltage, comprising:
   a power driver having a feedback input and a power driver voltage;
   a comparator having a comparator output related to a combination of the load voltage and a power driver current;
   a pulse generator controlled by the comparator output and having output pulses with fixed pulse widths; and
   a time limit circuit controlled by the output pulses, the time limit circuit providing the output pulses to the feedback input subject to a time limit between the output pulses.

2. The regulator of claim 1 wherein the output pulses are ON pulses.

3. The regulator of claim 1 wherein the output pulses are OFF pulses.

4. The regulator of claim 1 wherein the combination is a function of a weighted sum of the load voltage and the power driver current.

5. The regulator of claim 1 wherein the comparator further comprises a reference circuit and a sensing impedance sensing the power driver current.

6. The regulator of claim 5 wherein an inductance is coupled between the power driver voltage and the sensing impedance.

7. The regulator of claim 5 wherein the capacitance comprises a capacitor having a equivalent series impedance that is less than the sensing impedance.

8. The regulator of claim 1 wherein the comparator circuit comprises a comparator and a voltage divider coupled to the comparator.

9. The regulator of claim 1 wherein the power driver voltage output has a duty cycle that is controlled by both the load voltage and the power supply input voltage.

10. The regulator of claim 1 wherein the time limit circuit comprises a first one shot circuit and an AND function coupled to an output of the first one shot circuit.

11. The regulator of claim 1 wherein the pulse generator comprises a second one shot circuit and an OR function coupled to an output of the second one shot circuit.

12. The regulator of claim 1 wherein the comparator, the pulse generator and the time limit circuit are formed as an integrated circuit, and the integrated circuit further comprises a synchronous driver logic portion of the power driver.

13. The regulator of claim 1 further comprising a low pass filter coupled to the power driver output, the low pass filter providing the load voltage.

14. The regulator of claim 13 wherein the low pass filter comprises an inductance coupled to a capacitance.

15. The regulator of claim 13 wherein the comparator circuit further comprises a current limit circuit coupled to the power driver output and the load voltage, the current limit circuit having a current limit control output controlling the reference circuit to provide a soft start.

16. A regulator providing a load voltage, comprising:
    a power driver having a feedback input and a power driver voltage, a comparator having a comparator output related to a combination of the load voltage and a power driver current, and a pulse generator controlled by the comparator output and providing output pulses with a fixed width; and
    means for providing the output pulses to the feedback input subject to a time limit between the output pulses.

17. The regulator of claim 16 wherein the output pulses are ON pulses.

18. The regulator of claim 16 wherein the output pulses are OFF pulses.

19. The regulator of claim 16 wherein the combination is a function of a weighted sum of the load voltage and the power driver current.

20. The regulator of claim 16 wherein the power driver voltage output has a duty cycle that is controlled as a function of both the load voltage and the power supply input voltage.

21. A method of controlling a regulator, comprising:
    providing a comparator output related to a combination of load voltage and power driver current of the regulator;
    controlling a pulse generator to provide fixed width output pulses as a function of the comparator output; and
    providing a feedback input to the regulator that includes the output pulses subject to a time limit between the output pulses.

22. The method of claim 21 further comprising controlling a duty cycle of the feedback input as a function of the combination.

23. The method of claim 21 wherein the comparator output provides a comparison of the combination to a reference.

24. The method of claim 23 further comprising controlling the reference voltage as a function of the load voltage during a start up time to provide a soft start.

25. The method of claim 21 and further comprising filtering with a low pass filter to provide a load voltage that is filtered.

26. The method of claim 25 and further comprising forming the low pass filter with a ceramic capacitor with a low equivalent series resistance.

* * * * *